United States Patent [19]
Grisoni et al.

[11] Patent Number: 5,125,555
[45] Date of Patent: Jun. 30, 1992

[54] AUTOMATIC BRAZE WELDING MACHINE WITH SENSOR

[75] Inventors: Serafino Grisoni, Arenzano; Massimo Zironi, Bologna, both of Italy

[73] Assignee: Sapri S.P.A., Imola, Italy

[21] Appl. No.: 628,584

[22] Filed: Dec. 17, 1990

[51] Int. Cl.$^5$ .......................... B23K 5/00; B23K 37/02
[52] U.S. Cl. .............................................. 228/9; 228/45
[58] Field of Search ................... 228/7, 9, 11, 902, 10, 228/45, 244, 41; 219/124.4

[56] References Cited

U.S. PATENT DOCUMENTS

| | | | |
|---|---|---|---|
| 2,749,421 | 6/1956 | Mikulak et al. | 228/45 |
| 3,665,148 | 5/1972 | Yasenchak et al. | 228/45 |
| 4,010,346 | 3/1977 | Cecil et al. | 228/9 |
| 4,255,643 | 3/1981 | Balfanz | 228/9 |
| 4,267,424 | 5/1981 | Shimatake et al. | 228/45 |

FOREIGN PATENT DOCUMENTS

| | | | |
|---|---|---|---|
| 0598751 | 3/1978 | U.S.S.R. | 228/45 |
| 1388247 | 4/1988 | U.S.S.R. | 228/45 |

OTHER PUBLICATIONS

Metals Handbook, 9th edition, vol. 6, "Welding, Brazing, and Soldering", pp. 1, 1038, 1983.

Primary Examiner—Richard K. Seidel
Assistant Examiner—Jeanne M. Elpel
Attorney, Agent, or Firm—Ladas & Parry

[57] ABSTRACT

An automatic braze welding machine for braze welding metal elements comprising a robot, a braze welding head carried by the robot and sensor means for detecting the position of the elements to be welded and the consequent positioning of the head; the head comprises an oxyacetylene torch disposed along a first axis, means for supplying a welding alloy along a second axis convergent with the first axis, and torch displacement means, adapted to cause a reciprocating linear motion of the torch along the first axis coplanar with the axes and orthogonal to the first axis, and its inclination about the first axis.

14 Claims, 6 Drawing Sheets

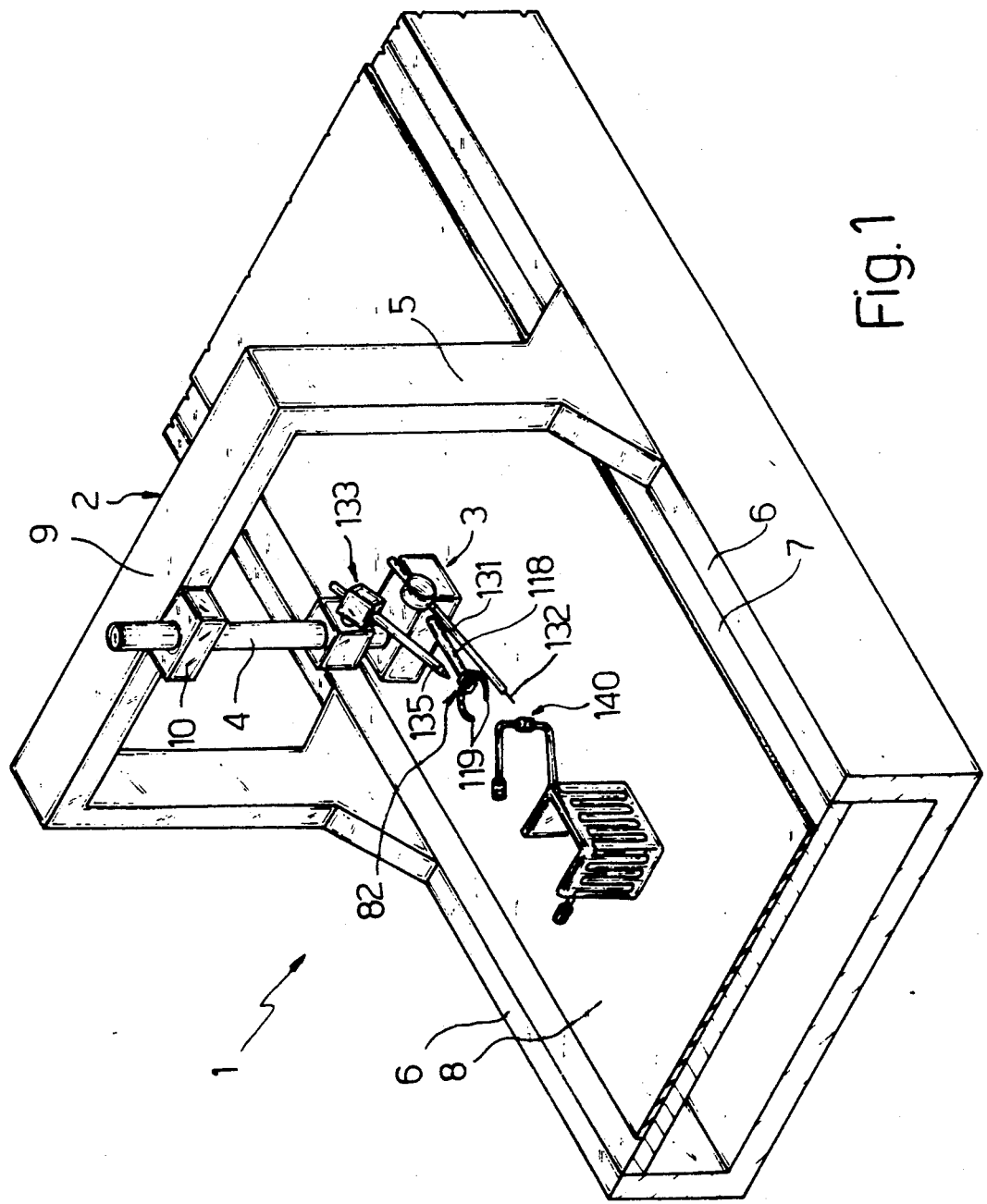

AUTOMATIC BRAZE WELDING MACHINE WITH SENSOR

BACKGROUND OF THE INVENTION

The present invention relates to a machine for automatically effecting braze welding and particularly, but not exclusively, for the connection by braze welding of tubular metal elements.

The connection of tubular metal elements by braze welding is an operation frequently utilized in various technical fields, and finds application for example in the production of refrigerating circuits for refrigerators and refrigerating cells, in circuits for the distribution of fluids in general (hydraulic, lubricant, fuel), in components for taps and fittings, and in the construction of tubular frames. these operations, which substantially comprise flame heating the elements to be joined (possibly with the introduction of a de-oxidizing substance) and depositing a welding alloy in the junction zone between the elements in manner coordinated to the movement and position of the flame, are currently performed manually by specialist operators.

SUMMARY OF THE INVENTION the object of the present invention is the provision of a machine which allows the said operations to be performed in an automatic manner, and in particular which is able to achieve connection of metal elements by braze welding, even elements of different shape and position, without recourse to particularly sophisticated and expensive positioning equipment.

The said object is achieved by the present invention in that it relates to an automatic machine for braze welding metal elements, characterized by the fact that it comprises support and motion means controlled by a programmable control unit and movable along a plurality of coordinate axes, a braze welding head fixed to the said support and motion means, and sensor means carried by the said braze welding head for spatial identification of the said elements to be walded and positioning of the said braze welding head, the said braze welding head comprising:

flame heater means disposed along a first axis;

means for supplying a welding alloy along a second axis convergent with the said first axis;

a first slide movable with respect to the said support and motion means along a third axis coplanar with the said first and second axes and orthogonal to the said first axis;

a second slide carried by the said first slide and movable with respect to it along the said first axis, the said heater means being carried by the said second slide and rotatable with respect to it about the said first axis;

first actuator means for the displacement of the said first slide along the said third axis;

second actuator means for the displacement of the said second slide along the said first axis; and third actuator means for the rotation of the said heater means about the said first axis.

BRIEF DESCRIPTION OF THE DRAWINGS

For a better understanding of the present invention a preferred embodiment thereof is described hereinafter purely by way of non-limitative example and with reference to the attached drawings, in which:

FIG. 1 is a schematic and perspective view of an automatic braze welding machine formed according to the principles of the present invention;

DETAILED DESCRIPTION OF THE INVENTION

Figure 3:
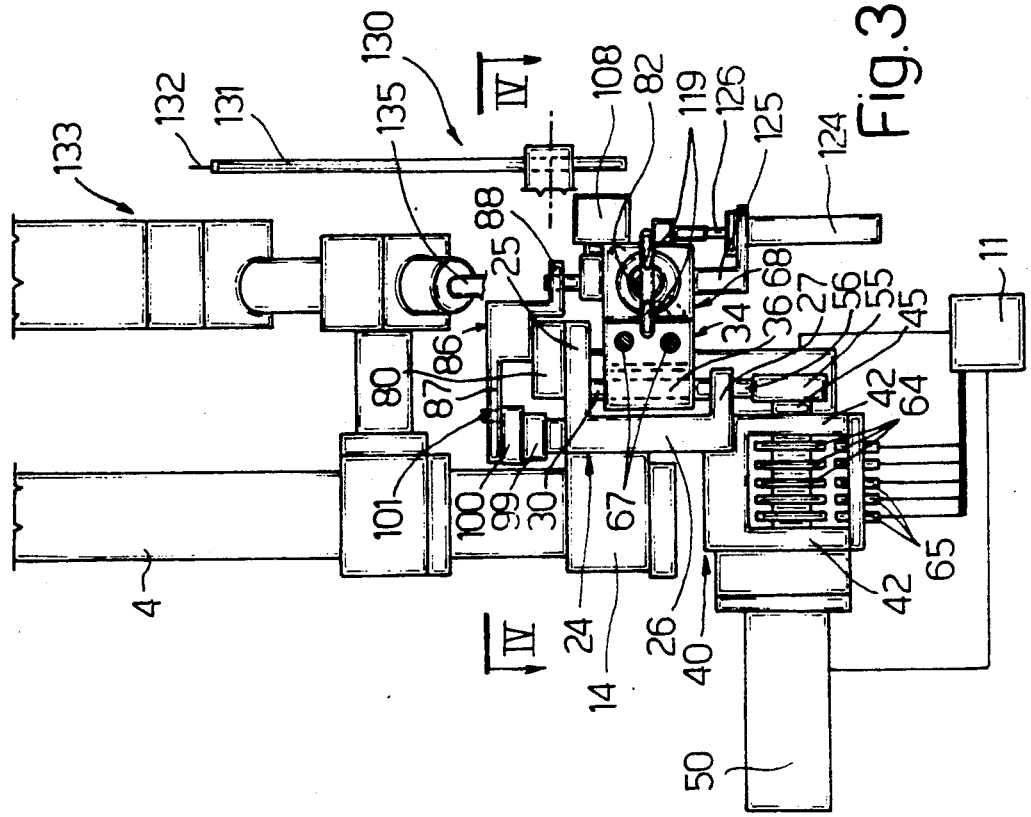
FIG. 3 is a schematic front elevation of the braze welding head of FIG. 2.

With reference to FIG. 1, an automatic braze welding machine for joining tubular metal elements, for example of the type employed in the production of refrigerating circuits, is generally indicated with the reference numeral 1.

The machine 1 substantially comprises an industrial robot 2 and a braze welding head 3 fixed to a support member 4 of the robot 2 movable in a space defined by a plurality of coordinate axes.

In the illustrated example the robot is of the portal type but any other known type of industrial robot could be used as long as it is adapted to produce the movement of the support member 4 with the required degrees of freedom for the type of application; the structure of the robot 2 is not binding and therefore will not be described in detail since it does not serve to assist the comprehension of the general operation of the machine 1.

the robot 2 generally comprises a portal carriage 5 slidable on respective lateral guides 6 of a base 7 on which the elements to be welded advance by means of a conveyor belt 8.

On an upper crosspiece 9 of the portal carriage 5 slides a smaller carriage 10 which carries a vertically movable column 4 constituting the said support member for the braze welding head 3.

The movement of the various movable parts of the machine 1, and in particular of the head 3 is controlled by a programmable processing and control unit 11.

Figure 9:
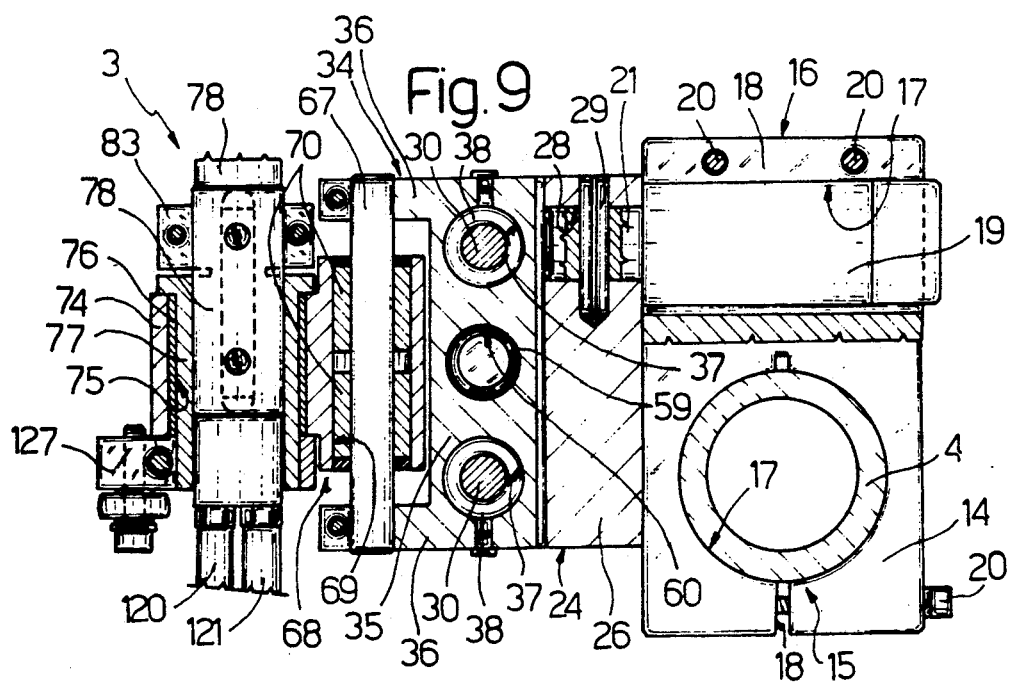
FIG. 9 is a section taken on the line IX—IX of FIG. 8.

The head 3 is secured projecting from a lower end of the column 4 by means of a fixing block 14 of parallelepiped form. This block 14 (FIG. 9) defines a pair of elastic jaws 15, 16 constituted by respective cylindrical seats 17 having respectively vertical and horizontal axes opened by respective slots 18 along their generatrices; the said jaws 15, 16 respectively house the column 4 and a support pin 19 for the head 3, and are clamped thereon by means of respective tangential clamp screws 20 extending across the slots 18.

The pin 19 has an end 21 of smaller diameter projecting from the block 14.

the head 3 includes a first bracket 24 having a substantially C-shape form and in particular including an upper, horizontal wall 25, a vertical intermediate wall 26 and a horizontal lower wall 27. The outer face of the intermediate wall 26 contacts a side wall of the support block 14, and is provided with a hole 28 in which the said end 21 of the pin 19 is housed. A transverse pin 29 fixes the first bracket 24 onto the pin 19. Between the upper and lower walls 25, 27 of the bracket 24 are mounted two vertical bars 30 spaced from one another and equidistant from the wall 26, which guide, along a vertical sliding axis C, a first slide 34 mounted in the space defined between the walls 25 and 27 of the bracket 24. In particular, the slide 34 is substantially C-shape and includes an intermediate wall 35 disposed parallel to the wall 26 of the bracket 24 and two flat sides 36; in the wall 35 of the slide 34 are formed two through holes 37 having vertical axes, in which are housed respective bushes 38 slidable on the said guide bars 30.

Figure 10:
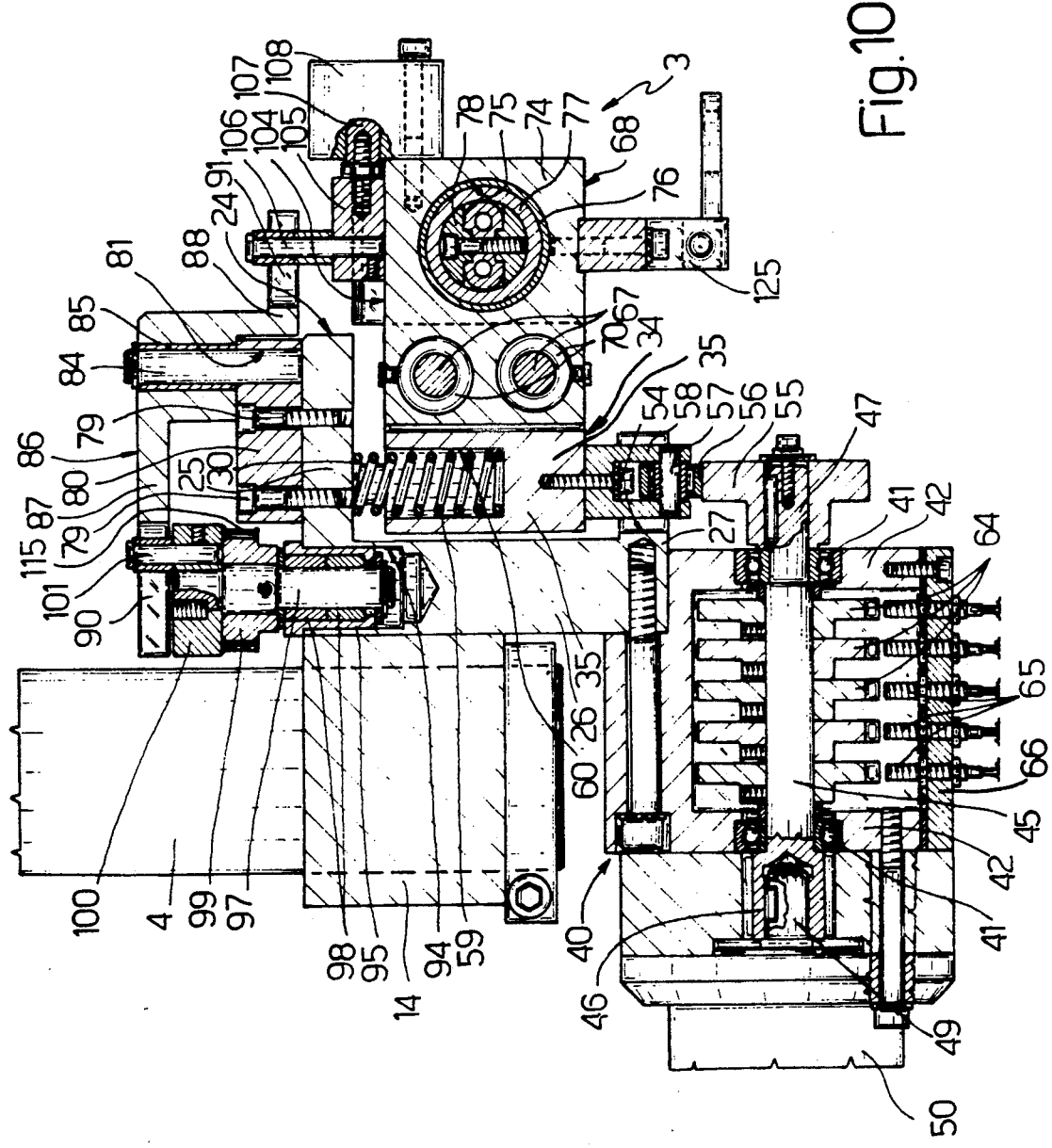
FIG. 10 is a section taken on the line X—X of FIG. 7.

To the first bracket 24, close to a lower corner of the intermediate wall 26, there is fixed by means of clamping screws 39 a second support bracket 40 (FIGS. 3 and 10) which is of downwardly open C-shape. This second bracket 40 supports, by means of a pair of bearing 41 housed in respective side walls 42 of the bracket 40, a spindle 45 which has respective end portions 46, 47 projecting from these walls. The end portion 46 opposite the first bracket 24 is fixed for rotation with an output shaft 49 of an electric geared motor 50 fixed to the corresponding side wall 42 of the bracket 40; on the opposite end portion 47, which is located vertically beneath a central aperture 54 formed in the lower part 27 of the first bracket 24, there is fitted a cam 55 cooperating with a small wheel 56 rotatable on a pin 57 carried by a support 58 fixed beneath the wall 35 of the first slide 34 and housed in the aperture 54. The wheel 56 is maintained in contact with the cam 55 by the action of a coil spring 59 housed in an upper central blind hole 60 of the wall 35 of the first slide 34 and compressed between the upper wall 27 of the bracket 24 and the bottom surface of the hole 60 itself.

On the spindle 45, within the bracket 40, there are fitted a plurality of control cams 64 acting to actuate a respective plurality of microswitches 65 mounted on a plate 66 fixed beneath the second bracket 40. These microswitches 65 are connected to the control unit 11 which controls the supply to the electric geared motor 50.

Between the sides 36 of the first slide 34 are fixed two superimposed spaced horizontal bars 57. In the space defined between the sides 56 there is mounted a second slide 68 substantially of parallelepiped form, which is slidable along the said bars 67, and provided for this purpose with respective through holes 69 housing respective pairs of bushes 70.

A portion 74 of the second slide 68 projects outwardly of the first slide 34 and is provided with a horizontal transverse through seat 75 parallel to the bars 67, in which is housed, with the interposition of a bronze bush 76, a rotatable hub 77 within which is mounted a handle 78 of an oxyacetylene torch 82, described in detail hereinbelow. In particular, the hub 77 integrally includes a portion 83 defining an elastic jaw clamped on the handle 78 itself.

On the upper wall 25 of the first bracket 34, in the centre and close to an outer edge thereof, there is fixed, by means of a pair of screws 79, a parallelepiped support block 80 provided with a vertical hole 81 in which is fixed a pin 84. A rocker 86 is articulated on the said pin 84 by means of a bronze bush 85. The rocker 86 has a large arm 87 extending above the upper wall 25 of the bracket 24 and spaced therefrom, and a smaller arm 88 projecting from the bracket 24, above and spaced from an upper wall 89 of the projecting portion 74 of the second slide 68. The said arms 87, 88 have respective longitudinal slots 90, 91.

On the upper wall 25 of the bracket 24, in the middle of the intermediate wall 26, there is formed a cylindrical seat 94 having a vertical axis in which is mounted a bush 95 which receives one end of a rotatable spindle 97 supported radially by a pair of bearings 98. On an intermediate portion of the spindle 97 there is fitted a pulley 99, on an opposite end of the spindle 97 there is mounted a ring 100 on which a peg 101 having a vertical axis is fixed in an eccentric position. This peg 101 slidably engages the slot 90 of the larger arm 87 of the rocker 86. On an upper face of the said projecting portion 74 of the second slide 68 there is formed a groove 104 in which is slidably disposed a support block 105 on which is mounted a vertical axis drive peg 106 which slidably egages the slot 91 of the smaller arm 88 of the rocker 86. The block 105 is fixed to a movable arm 107 of a pneumatic actuator 108 mounted so as to project from an outer face of the second slide 68.

Figure 2:
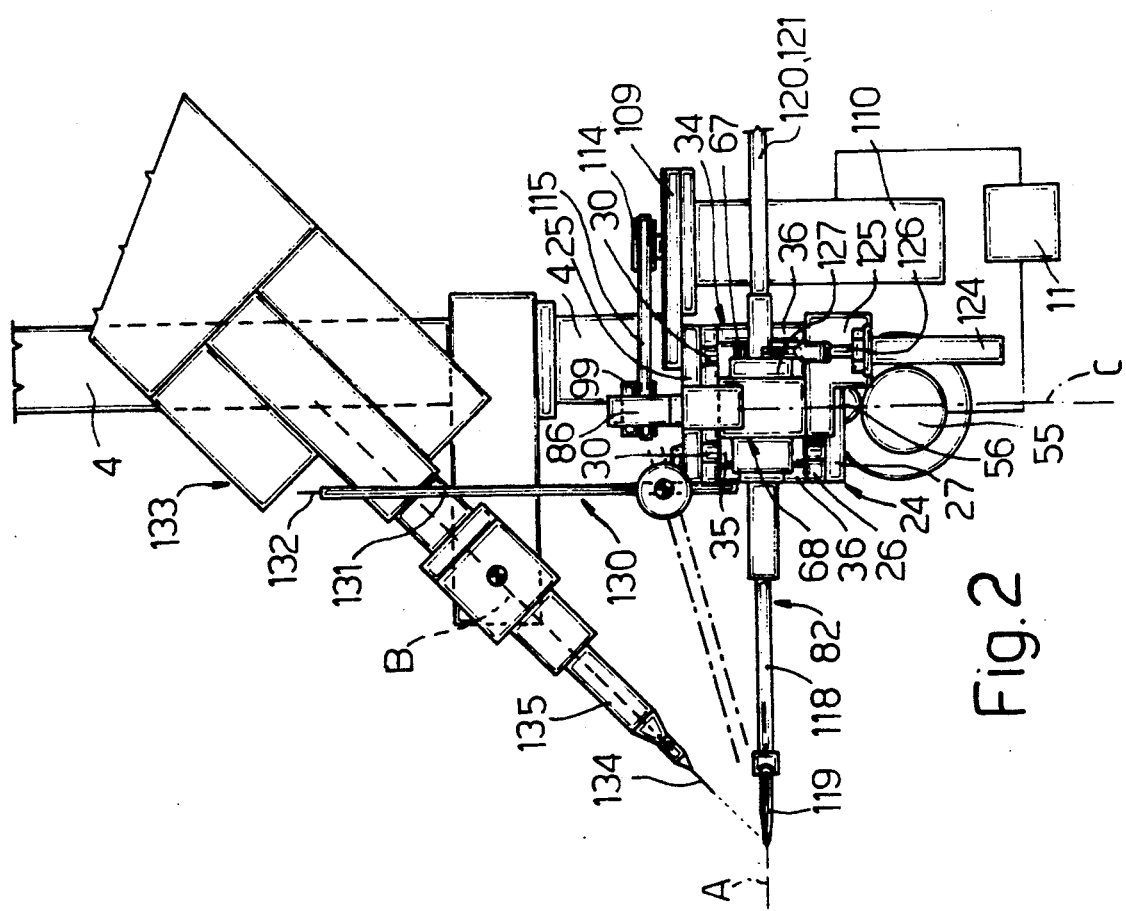
FIG. 2 is a schematic side view, on an enlarged scale, of a braze welding head of the machine of FIG. 1.
Figure 7:
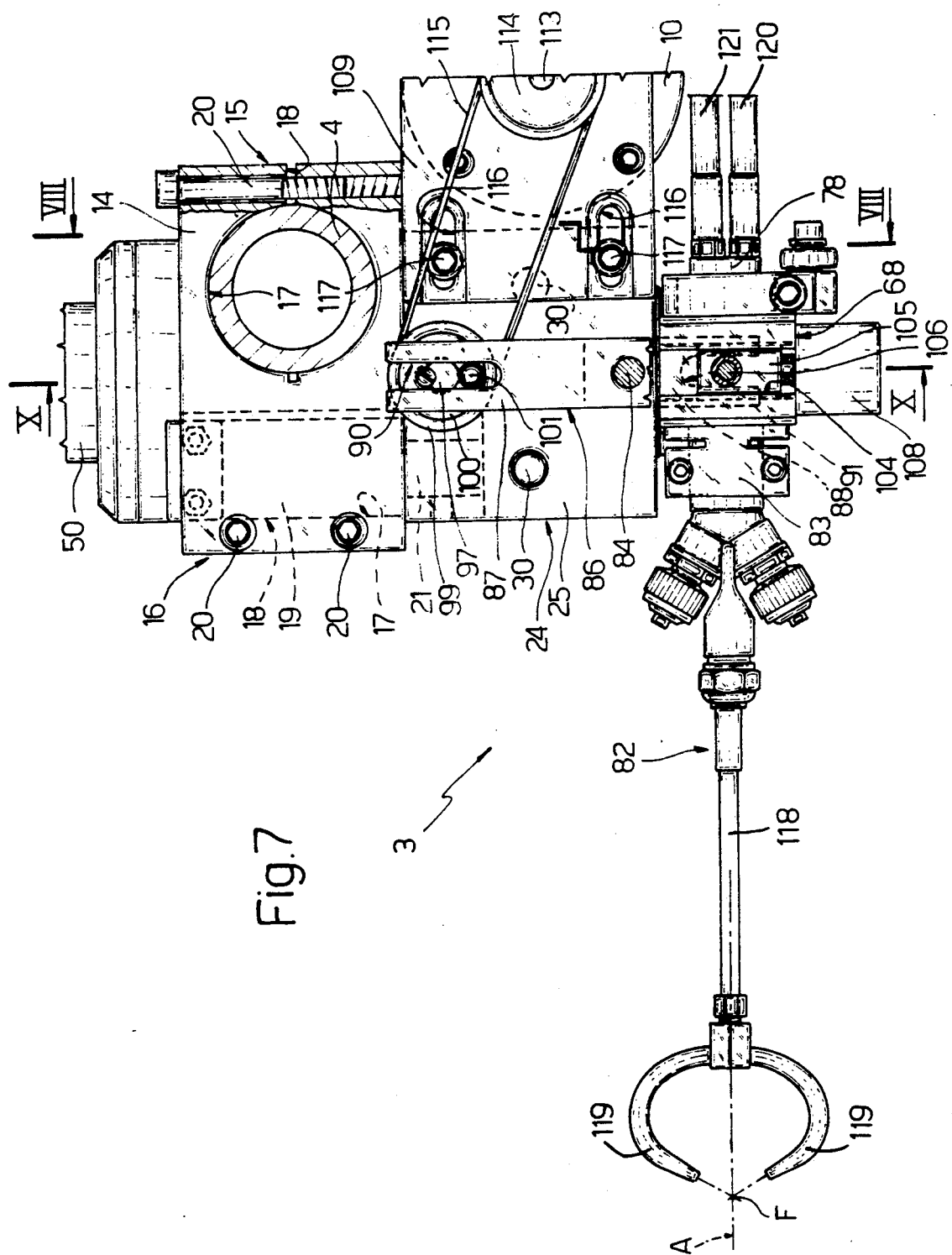
FIG. 7 illustrates a portion of FIG. 4 in detail and on a further enlarged scale.

On the upper wall 25 of the first bracket 24 there is mounted, projecting towards a rear zone of the head 3, a horizontal plate 109 (FIGS. 2, 7) beneath which an electric geared motor 110 is fixed with its axis verical. On an output shaft 113 of the geared motor 110, which projects upwardly through a hole (not illustrated) in the plate 109, is fitted a drive pulley 114 coupled for rotation with the said pulley 99 by a belt 115. The position of the plate 109 with respect to the bracket 24 and consequently the tension in the belt 115 is adjustable in that the plate 109 is provided with a pair of through slots 116 parallel to the bars 67 slidably engaged by respective fixing screws 117 of the bracket 24 itself.

Electrical supply to the geared motor 110 is controlled by the said unit 11.

The torch 82 (FIG. 7) comprises a horizontal rectilinear lance 118 extending axially from the handle 78 forwardly of the head 3 along an axis A parallel to the axis of the guide bars 67 of the second slide 68. At one end of the lance 118 there are two nozzles 119 for delivery of the flame, these are of coplanar curved form converging towards a point F lying on the axis A. The torch 82 is supplied by a pair of tubes 120, 121 for delivering oxygen and acetylene respectively, connected to the rear end of the handle 78. The acetylene is conveniently preliminarily mixed with a deoxidising gas.

Figure 8:
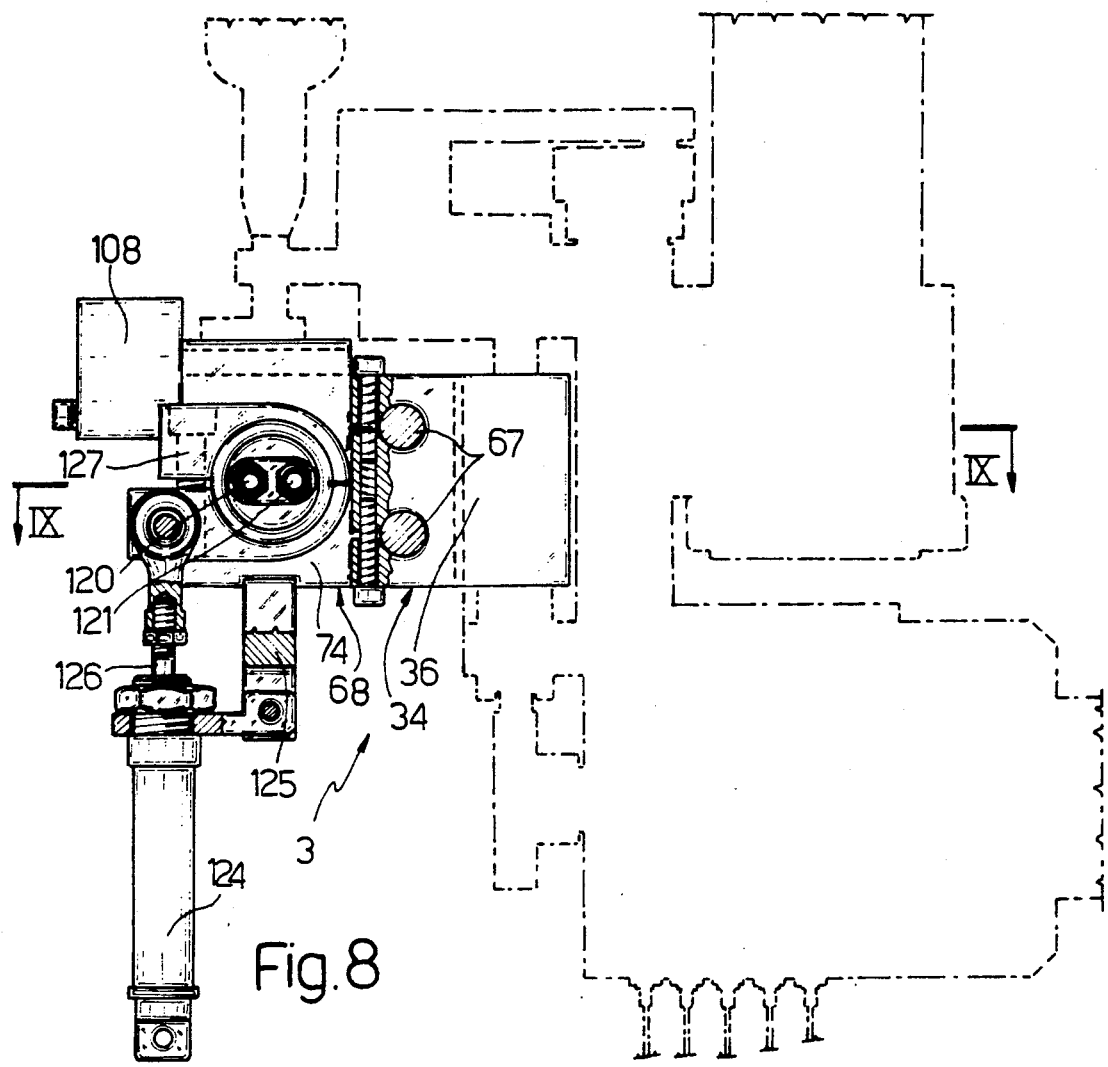
FIG. 8 is a partially sectioned partial view taken on the line VIII—VIII of FIG. 7.

As is clearly illustrated in FIG. 8, a pneumatic cylinder 124 is pivoted, in a substantially vertical position, to a support 125 fixed to a lower region of the second slide 68. A piston rod 126 (not illustrated) of the cylinder 124 is articulated in an eccentric position to a jaw 127 clamped on the hub 77 which houses the handle 78 of the torch 82, in such a way as to control rotation of the hub 77 itself about its axis A.

The machine 1 further includes a tactile sensor device, generally indicated with the reference numeral 130 and partially illustrated in FIGS. from 1 to 4. The device 130 substantially comprises a rod 131 pivoted to a support not illustrated fixed to the bracket 24 and rotatable with respect thereto about a horizontal axis orthogonal to the axis A of the torch 82 between a first, substantially vertical rest position illustrated in FIG. 2 in solid outline, and a second, operative position inclined forwardly and downwardly, as illustrated in FIG. 1 and, in broken outline, in FIG. 2.

On the end of the rod 131 is disposed an omnidirectional feeler 132 of known type, which is adapted to send electrical signals to the control unit 11 of the machine 1 electrical signals upon contact with an external body.

The machine 1 finally includes a welding alloy supply unit 133 of any conventional type available on the market and therefore not described in detail. The welding alloy is presented in the form of a solid wire 134. The unit 133 is fixed on one side of the column 4 vertically above the head 3. This unit 133 includes adjustment means, not illustrated, for adjusting the quantity and speed of delivery of the welding alloy, and a wire guide unit 135 disposed along an axis B lying in the vertical plane containing the axis A of the torch 82, inclined substantially at 45° and intersecting it close to the point F.

Figure 6:
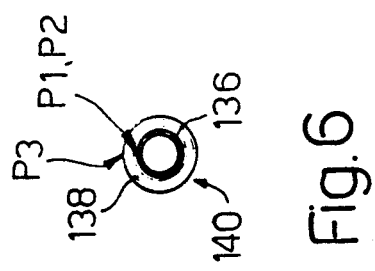
FIG. 6 is a section taken on the line VI—VI of FIG. 5.
Figure 5:
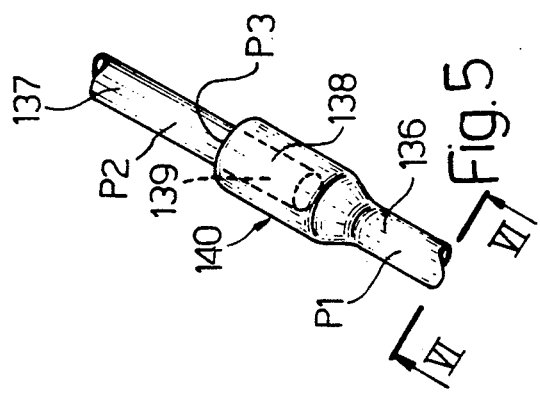
FIG. 5 is a perspective view of a pair of tubular elements which can be connected together by braze welding.
Figure 4:
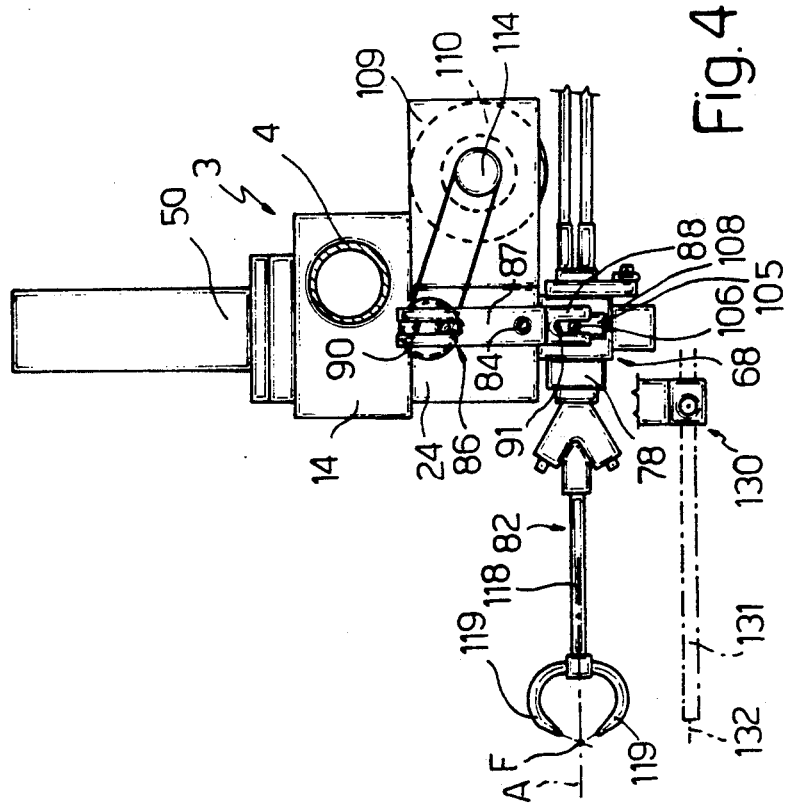
FIG. 4 is a schematic sectional view taken on the line IV—IV of FIG. 3.

The operation of the machine 1 is described hereinbelow with reference to a specific exemplary application. In FIGS. 5 and 6 there is illustrated a joint 140 between two tubes 136, 137 of a refrigerating circuit. The tube 136 has a cup-shape end 138 within which is inserted a corresponding end 139 of the tube 137.

Identification of the position and dimensions of the joint 140, it being supposed that the plane in which the tubes lie is known, which is assumed for simplicity to be orthogonal to the axis A of the torch 82, constitutes the first phase of the working cycle of the machine 1.

The rod 131, normally in the rest position, is moved into the operative position and the head 3, given that the plane of the joint 140 is known, is displaced automatically by the control unit 11 in such a way that the feeler 132 intercepts the two tubes 136, 137 for example in the respective points indicated P1 and P2; the program for control of the unit 11 is such as to cause immediate arrest of the head 3 after impact of the feeler 132 and, most importantly, to memorise the instantaneous coordinates of the contact points. With the positions of P1 and P2 known, the direction of the axes of the tubes 136, 137 is identified and the head 3 is displaced parallel to this axis in such a way that the feeler 132 intercepts the edge of the cup-shape end 138, for example at point P3. The coordinates of the point P3 are also memorised and, the geometry of the workpieces being known, the position of the joint in space is identified.

The rod 131 is then moved by the pneumatic actuator into the rest position in such a way as not to interfere with the welding operation.

The head 3 is displaced in such a way as to bring the torch 82 close to the joint 140 according to the coordinates identified by the feeler 132.

The head 3 is able to adjust the aspect of the torch 82 with respect to the welding alloy supply unit 133, and in particular to vary the position thereof in a vertical sense, and the inclination about its axis A.

In particular, the position of the torch 82 in the vertical direction is regulated by the geared motor 50, which controls the rotation of the spindle 45 and therefore of the cam 55. This cam 55 cooperates with the wheel 56 carried by the first slide 34, which is guided vertically along the axis C by the bars 60. The rotation of the cam 55 causes a corresponding vertical translation of the first slide 34; the second slide 68 and the torch 82 are carried by the first slide 34 and are therefore displaced fixedly with it.

Variations in the vertical sense of the position of the torch 82 is obtained in a discrete manner by means of the cams 65 each of which commutes the corresponding microswitch 64 in a different angular position. The control unit 11, in dependence on the coordinates detected by the feeler 132 selects the optimum vertical position of the torch 82 from the various possible positions; stopping of the geared motor 50 in the angular position which corresponds to the correct height of the cam 55 is caused by the control unit 11 following commutation of the signal generated by the microswitch 64 corresponding to this position.

The angular position of the torch 82 about its axis A is also adjustable in a discrete manner. This adjustment, which in the illustrated example is limited to only two positions, is obtained by means of the pneumatic cylinder 124 which rotates the hub 77 carrying the torch 82.

Once the attitude of the torch 82 has been defined the head 3 finally performs an oscillation of the torch 82 along its axis A that is to say in a direction transverse the joint, in such a way as to obtain a uniform heating of the joint itself; the amplitude of this oscillation is adjustable in such a way as to allow an optimum heating of joints having different diameters.

In particular, the oscillatioin of the torch 82 along its axis A is controlled by the geared motor 110 which drives the drive pulley 114 the rotation of which is transmitted by the belt 115 to the pulley 99 and therefore to the spindle 97.

The eccentric peg 101 fixed to the spindle 97 slides in the slot 90 of the larger arm 87 of the rocker 86 and acts as a crank transmitting to this latter an oscillatory rotating motion about the pin 84. This oscillatory motion is then transmitted by the smaller arm 88 of the rocker 86 to the drive peg 106, and from this to the block 105 and then to the second slide 68 which oscillates along the guide bars 67 parallel to the axis A. The amplitude of this oscillation is adjusted by the actuator 108 which defines two different positions of the drive peg 106 with respect to the pin 84 constituting the fulcrum of the rocker 86, therefore varying the arm length thereof.

The braze welding requires a certain time for preheating of the joint 140 and the alloy 134 after commencement of the delivery of the alloy 134 which is progressively fused and deposited into the joint 140. The flame is maintained on the joint 140 during the whole time the alloy 134 is being delivered, and for a time after this sufficient to allow a correct distribution of the alloy itself.

In summary, the head 3 allows different types of welding to be performed automatically, for each of which the control unit 11 memorizes the following parameters:

joint preheating time;
alloy preheating time;
flame dwell time after delivery of the alloy;
quantity of alloy to deliver;
speed of delivery of the alloy;
optimum distance of the heating focal point F from the alloy delivery point, that is vertical coordinates of the torch;
amplitude of the horizontal oscillations of the torch;
optimum inclination of the torch about its axis.

From a study of the characteristics of the machine 1 formed according to the present invention the advantages which can be obtained thereby are evident.

In particular, this machine 1 allows braze welding to be performed in an automatic and versatile manner, and is provided with sensor means which allow the position of the joint to be welded to be identified with the necessary precision. This joint can therefore be positioned in space in a very approximately manner, with an evident saving of equipment utilized for this purpose.

Finally, it is clear that the machine 1 described can have modifications and variations introduced thereto which do not depart from the protective ambit of the present invention. In particular, as already indicated hereinabove, the robot 2 can be replaced by an automatic movement means adapted for this purpose; the supply unit 133 for supplying the welding alloy 134 can be of any known type; adjustment of the position of the torch 82 in the vertical direction and inclination of the torch itself can be achieved in a continuous rather than a discrete manner. Finally, the deoxidant can be contained in the welding alloy or else deposited on the workpieces to be welded.

We claim:

1. An automatic machine for braze welding metal elements, comprising:

support and motion means for positionable movement along a plurality of coordinate axes;

a braze welding head fixed to said support and motion means, said braze welding head comprising:

flame heating means for positioning along a first axis (A);

supply means for supplying a welding alloy along a second axis (B) that is convergent with said first axis;

a first slide positionably movable with respect to said support and motion means along a third axis (C) that is coplanar with said first and second axes and orthogonal to said first axis;

a sescond slide carried by said first slide and positionably movable with respect to said first slide along said first axis, said flame heating means being carried by said second slide and positionably rotatable with respect to said second slide about said first axis;

first actuator means for said positionable movement of said first slide along said third axis;

second actuator means for said positionable movement of said second slide along said first axis, whereby to reciprocate the flame heating relative to a metal element to be brazed welded; and third actuator means for said rotationally positionable movement of said flame heating means about said first axis;

sensor means carried by said braze welding head for spatial identification of elements to be welded; and a programmable control unit for positioning said support and motion means and for said positionable movement initially of at least said first and thrid actuator means in response to electric signals received from said sensor means.

2. A machine according to claim 1, and further comprising stop means (64, 65) for stopping said positioning movements of said first actuator means (50) with said first slide (34) in a position selected by the said control unit (11).

3. A machine according to claim 1, wherein said second actuator means comprise a geared motor (110) and transmission means (115, 86) acting to transform the rotation of the said geared motor (110) into the said linear reciprocating motion of the said second slide (68).

4. A machine according to claim 3, wherein said transmission means comprise a rocker (86) oscillating about a fulcrum (84), the arms (87, 88) of which rocker are slidably engaged respectively by crank means (100, 101) driven by the said geared motor (50) and by a drive peg (106) carried by the said second slide (68).

5. A machine according to claim 1, and further comprising adjustment means (108) for adjusting the amplitude of said reciprocating movement of said second slide (68).

6. A machine according to claim 5, wherein said adjustment means comprises an actuator (108) fixed to a drive peg (106) of the said second slide (68) for varying the distance thereof from a fulcrum (84) of a rocker (86).

7. A machine according to claim 1, wherein said first actuator means comprise a geared motor (50) and cam means (55) carried on an output shaft (49) of the said geared motor (50) and cooperating with abutment means (56) carried by the said first slide (34).

8. A machine according to claim 7, wherein said abutment means (56) comprise a plurality of cams (64) carried on said output shaft (49) of the said geared motor (50) and a plurality of microswitches (65) connected to the said control unit (11), said microswitches being commutated by respective of said cams (64) in different angular positions of the said output shaft (49).

9. A machine according to claim 1, wherein said flame heating means (82) are supported by a hub (77) housed in the said second slide (68); and the said third actuator means comprises a pneumatic cylinder (124) an actuating arm (126) of which is connected eccentrically to said hub (77).

10. A machine according to claim 9, wherein said heating means comprise an oxyacetylene torch (82).

11. A machine according to claim 10, wherein said torch (82) includes a handle (78) housed in the said hub (77), a lance (118) disposed along the said first axis (A) and a pair of terminal flame delivery nozzles (119) coplanar with one another and of curved form converging towards a point (F) situated on the said first axis (A).

12. A machine according to claim 1, wherein said sensor means (130) include an omnidirectional feeler (132).

13. A machine according to claim 12, wherein said sensor means (130) include support means (131) for the said feeler (132) movable between an operative position in which the said feeler (132) is extended towards the elements to be welded, and a rest position in which the said feeler (132) is retracted.

14. A machine according to claim 13, wherein said support means for the said feeler comprise a rod (131) pivoted to the said braze welding head (3) and actuator means for displacement of the said rod (131) between the said operative position and the said rest position.

* * * * *